United States Patent [19]

Schilling

[11] Patent Number: 5,188,665
[45] Date of Patent: Feb. 23, 1993

[54] LIGNIN AMINE SALT-BASED BINDERS FOR WATER-BASED BLACK INK FORMULATIONS

[75] Inventor: Peter Schilling, Charleston, S.C.
[73] Assignee: Westvaco Corporation, New York, N.Y.
[21] Appl. No.: 825,533
[22] Filed: Jan. 24, 1992
[51] Int. Cl.$^5$ ............... C09D 11/14; C08L 97/00; C07G 1/00
[52] U.S. Cl. ............... 106/26 R; 106/123.1; 106/30 R; 530/500; 530/505
[58] Field of Search ............... 106/26, 123.1; 530/500, 530/505

[56] References Cited

U.S. PATENT DOCUMENTS

| | | | |
|---|---|---|---|
| 4,357,454 | 11/1982 | Holmberg et al. | 106/123.1 |
| 4,612,051 | 9/1986 | Miller, Jr. et al. | 106/30 |
| 4,732,572 | 3/1988 | Dilling | 106/123.1 |
| 4,740,591 | 4/1988 | Dilling et al. | 530/505 |
| 4,797,157 | 1/1989 | Dilling et al. | 106/20 |
| 4,891,070 | 1/1990 | Dilling et al. | 106/26 |
| 5,066,331 | 11/1991 | Hutter | 106/30 |

FOREIGN PATENT DOCUMENTS 1107249 3/1968 United Kingdom .

*Primary Examiner*—Mark L. Bell
*Assistant Examiner*—Helene Klemanski
*Attorney, Agent, or Firm*—Daniel B. Reece, IV; Terry B. McDaniel; Richard L. Schmalz

[57] ABSTRACT

A method of producing a lignin amine salt resin composition for black aqueous printing ink formulation having an improved storage stability wherein from 10 to 60% of the lignin amine salt resin is replaced by acrylic resin, rosin resin, or a combination thereof. The lignin amine salt formulation functions as a grinding agent for the pigment in formulating and as a binder for the pigment in the printing process.

8 Claims, No Drawings

LIGNIN AMINE SALT-BASED BINDERS FOR WATER-BASED BLACK INK FORMULATIONS

FIELD OF INVENTION

The invention relates to improved water-based black ink formulations. In particular, the invention relates to improved lignin amine salt-based binder resins for flexographic water-borne black ink formulations.

BACKGROUND OF THE INVENTION

A growing area in the field of printing is known as flexography or flexographic ink printing. Flexographic ink printing is a branch of rotary typographic printing in which the printing is applied to a print-receiving substrate by use of a flexible relief plate with highly fluid, volatile inks which dry rapidly by evaporation. The process was originally limited to printing paper bags, but many inroads have been made in recent years to extend the process to printing various flexible packaging, textiles, newsprint, and other print-receiving substrates.

A flexographic printing ink generally contains three basic types of ingredients denominated as a solvent, a colorant, and a binder. Minor amounts of other additives also may be employed to provide the desired characteristics (i.e., rheology, viscosity, etc.) for the printing ink composition.

In recent years, increased emphasis has been placed on the use of water as the solvent, rather than an oil-based solvent. Carbon black pigment is commonly used as the colorant in both water-based and oil-based black ink formulations.

The binder component of the printing ink composition generally comprises a resin which functions primarily to increase adhesion of the pigment to the substrate, while also often acting as a dispersing medium and carrier. Acrylic polymer lattices have traditionally been employed as binders in water-based printing ink compositions. However, these acrylic binders are relatively expensive. Thus printing ink formulators have actively sought low-cost alternative binders.

One promising source of alternative low-cost binders under evaluation is lignin. Lignin is a complex, high-molecular weight polymer occurring naturally in close association with cellulose in plants and trees. In the paper-making industry, lignin may be recovered as a by-product of the cellulose product.

Commonly assigned U.S. Pat. No. 4,740,591 (which is hereby incorporated by reference) teaches a method for forming an amine salt of lignin via precipitating lignin from the black liquor residue of a kraft pulping process by acidification and reacting the precipitated lignin with an organic amine. In this method the precipitated lignin was acidified to a pH of no lower than about 5 for the wash-water removal of inorganic salts and other impurities. This method yields a lignin salt with a high level of water-solubility.

A method of using this lignin amine salt as a binder for aqueous printing ink compositions is taught in commonly assigned U.S. Pat. No. 4,891,070 (which is hereby incorporated by reference). However, a major problem has recently been discovered in that inks prepared with this type of binder have proven not to be storage stable (particularly at elevated temperatures). Over time viscosity increases and sediments are formed or gel-like inks are obtained which are extremely difficult to dilute to desired press-ready viscosities (commonly about 10 seconds as measured via a #3 Shell Cup or about 20 seconds via a #2 Zahn Cup).

Therefore, it is the object of this invention to provide an improved low-cost lignin amine salt binder for use in producing storage stable, low viscosity flexographic water-borne black ink formulations.

SUMMARY OF THE INVENTION

The object of this invention is met by replacing 10–60% by weight of the lignin amine salt with acrylic resin, rosin resin, or a combination of the two. A further improvement lies in replacing the monoamine organic amine compound taught in U.S. Pat. No. 4,891,070 with a polyamine compound. These substitutions produce low cost binders suitable for use in producing storage stable, low viscosity flexographic water-borne black ink formulations.

DESCRIPTION OF THE PREFERRED EMBODIMENT

As noted above, commonly assigned U.S. Pat. No. 4,740,591 teaches the recovery of lignin by-products from the black liquor of a kraft pulping process by initial precipitation of the lignin from the black liquor (as by treatment with carbon dioxide) and by subsequent controlled water-wash purification of the precipitated lignin without subjecting them to highly acidic conditions for significant time periods. Preferably, the precipitated lignins are water-wash purified at mild levels of acidity, preferably at pH levels above about 5. The purified lignins may then be substantially completely solubilized in aqueous medium by addition of an organic monoamine, such as monoethanolamine, to produce a highly stable, water-soluble salt for subsequent use as a grinding aid and binder in water-based carbon black printing systems.

By not subjecting the lignin to highly acidic conditions, i.e., to pH levels of about 5 or below during recovery from the black liquor and purification, the lignin by-product is substantially fully water-soluble in amine salt form. The lignin amine salts then can be employed in aqueous printing compositions.

The process of U.S. Pat. No. 4,740,591 involves the steps of: (1) initially precipitating the lignin from the black liquor of a kraft pulping process by lowering the pH level of the black liquor to a pH of about 9.5, (2) further acidifying the precipitated lignin composition, and (3) washing the precipitated lignin product with water to remove inorganic salts and other impurities while avoiding exposure of the lignin to pH levels of about 5 and below. The pH level of the lignin should b maintained higher than about 5 at all times in its recovery, purification, and storage until use in water-solubilized form.

The recovered and purified lignin by-product is rendered water-soluble by addition of an organic amine for subsequent use in a water-based printing composition. Lignins which are recovered, purified, and maintained at pH levels above about 5 exhibit as much as about 95% to 99% water-solubility with monoethanolamine when the amine addition is about 10% by weight of the solid lignin, and as much as about 99% or better when the amine addition is about 13.3% by weight of the solid lignin. In contrast, lignins recovered, purified, and maintained at acidic pH levels below 5 (e.g., 1.5 to 3) for an extended time period (e.g., of more than about an hour) are significantly less water-soluble in amine salt form.

As previously referenced, this lignin amine salt is utilized as a binder in commonly assigned U.S. Pat. No. 4,891,070 to produce an aqueous printing ink composition. The steps for producing this composition comprise:
(a) lowering the pH of a black liquor residue of the kraft pulping process to a pH of about 9.5 to precipitate the lignin material therefrom;
(b) acidifying the lignin precipitate in aqueous slurry to an acidic pH level above about 5;
(c) washing the acidified lignin precipitate with water to remove inorganic salts and other impurities therefrom; and
(d) adding an organic amine to an aqueous slurry of the washed lignin to form a lignin amine salt solution having a pH in excess of 5.

In the method taught in U.S. Pat. No. 4,891,070, the organic amine compound is commonly selected from the group consisting of:
mono-, di-, and triethanolamine;
mono-, di-, and trimethyl (ethyl) amine; and
ono-, di-, and tripentylamine.

Improved binder resin compositions suitable for use in water-based black ink formulations are produced by replacing 10–60% by weight preferably 20 to 50% by weight of the lignin amine salt binder as taught in U.S. Pat. 4,891,070 with acrylic resin, rosin resin, or a combination thereof. A further improvement is made by using polyamine compounds in place of the monoamine compounds taught in U.S. Pat. No. 4,891,070.

Acrylic resins which are suitable for use in the improved binder resin compositions are styrene (α-methylstyrene)-acrylic acid copolymers having a molecular weight in the range of about 1,000 to 100,000 and an acid number of about 70 to 250. Procedures for producing these acrylic resins are well known to those skilled in the art, as acrylic resins are widely used as binders in water-based inks. An excellent example of a common method for preparing acrylic resins is given in Great Britain Patent No. 1,107,249 (which is hereby incorporated by Commercially available acrylic resins which are suitable for use in the improved binder resin compositions include, but are not limited to, the following:
Joncryl J-62 (manufactured by S. C. Johnson),
Joncryl J-67 (manufactured by S. C. Johnson),
Joncryl J-85 (manufactured by S. C. Johnson),
Joncryl J-91 (manufactured by S. C. Johnson),
Joncryl J-142 (manufactured by S. C. Johnson),
Joncryl J-678 (manufactured by S. C. Johnson),
Joncryl J-680 (manufactured by S. C. Johnson),
Joncryl J-682 (manufactured by S. C. Johnson),
Lucidene 141 (manufactured by Morton International),
Lucidene 370 (manufactured by Morton International),
Lucidene 602 (manufactured by Morton International),
Lucidene 710 (manufactured by Morton International),
Morez 100 (manufactured by Morton International),
Stafor 50 (manufactured by Westvaco).

Rosin resins which are suitable for use in the improved binder resin compositions are rosin fortified via a Diels-Alder reaction with fumaric acid or maleic anhydride and further reacted via an esterification reaction with pentaerythritol, glycerol, glycol, polyglycols sorbitol, or the like. These rosin resins have an acid number in the range of 150 to 220.

Other suitable, preferred rosin resins are obtained by high-temperature polyalkylene amine treatment of rosin fortified (via a Diels-Alder reaction) with fumaric acid or maleic anhydride (see Example 1). Here the ratio of polyalkylene amine to the amount of fumaric acid or maleic anhydride used for the fortification is 0.1 to 0.5 moles of amine per mole of fumaric acid or maleic anhydride. These rosin resins have an acid number in the range of 130 to 200. Suitable polyalkylene amines include, but are not limited to, the following: piperazine, ethylenediamine, diethylenetriamine, aminoethylpiperazine, triethylenetetramine, aminoethylethanolamine, hydroxyethylpiperazine, Amine HH, and combinations thereof.

Procedures for producing the above suitable rosin resins are well known to those skilled in the art, as rosin resins are widely used as binders in water-based inks. An excellent example of a method for preparing rosin resins is taught in commonly assigned U.S. Pat. No. 5,066,331 (which is hereby incorporated by reference). A rosin resin which is commercially available and suitable for use in the improved binders is Jonrez SM-700 (manufactured by Westvaco).

Polyamine compounds which are suitable for use as organic amine compounds in the improved binder resin compositions include, but are not limited to, the following: piperazine, diethylenetriamine, aminoethylpiperazine, triethylenetetramine, aminoethylethanolamine, hydroxyethylpiperazine, Amine HH, and combinations thereof.

As appreciated in the art, the exact components and properties of components desired for any given ink application can vary, and, therefore, routine experimentation may be required to determine the optional components and proportions of components for a given application and desired properties.

The following examples are provided to further illustrate the present invention and are not to be construed as limiting the invention in any manner.

EXAMPLE 1

A preferred rosin binder resin was produced via the following procedure. All reactants are measured in parts by weight. One hundred (100) parts of Rosin SS (a tall oil based rosin manufactured by Westvaco, Inc.) was heated to 200° C. under a positive nitrogen pressure. Fifteen (15) parts of fumaric acid was added in a single portion to the hot resin. The mixture was stirred at 200° C. for 2 hours. Over a period of 30 minutes 11.5 parts of Amine HH (see Table I below) was slowly added to the adduct and heated to 240° C. (until all water of condensation was removed). The product was allowed to cool and the resin (hereafter referred to as Resin A) collected.

Following the procedures taught in commonly assigned U.S. Pat. Nos. 4,740,591 and 4,891,070, a lignin amine salt binder was produced by: (1) initially precipitating the lignin from the black liquor of a kraft pulping process by lowering the pH level of the black liquor to a pH of about 9.5, (2) further acidifying the precipitated lignin composition with a mineral acid to a pH of about 5 to 6, and (3) washing the precipitated lignin product with water to remove inorganic salts and other impurities while avoiding exposure of the lignin to pH levels of about 5 and below. The pH level of the lignin was maintained higher than about 5 at all times in its recovery, purification, and storage until use in water-solubilized form by adding monoethanolamine (to a pH range of about 8.5–10).

A number of black inks were formulated for evaluation as follows:
- 18.0% Vulcan K (a carbon black manufactured by Cabot Chemicals, Inc.)
- 9.0% Lignin Amine Salt/Resin A binder resin combination (adjusted with monoethanolamine)
- 0.5% Surfynol 104E (a defoamer manufactured by Air Chemicals, Inc.)
- 72.5% Water A series of lignin amine salt (LAS)/Resin A resin combinations were produced for use in the ink evaluations via the following procedure. Varying amounts of Resin A (see Table I below) were dissolved at 30–35% non-volatile (N.V.) solids with the aid of monoethanolamine (pH 9.0) and added to slurries of LAS at pH 9.2. Each composition was stirred for 30 minutes and the pH readjusted to 9.2. Carbon black was added and ground for 1.5 hours on a paint shaker. The grinds were readjusted to pH 8.5 (after grinding the pH values were between 7.8 and 8.2) and subsequently subjected to a heat storage stability test via being stored in an oven at 125° F. for 3 weeks. The results are listed in Table I below.

TABLE I

Evaluation of LAS/RESIN A[a] Blends Aged 3 Weeks at 125° F. Carbon Black: Vulcan K

| % LAS | % RESIN A | pH Value[b] A | B | Viscosity[b)c] A | B | Comments[d] |
|---|---|---|---|---|---|---|
| 9 | 0 | 8.80 | 7.68 | 8.7 | 9.2 | 3 |
| 8 | 1 | 8.54 | 7.69 | 8.9 | 8.2 | 3 |
| 7 | 2 | 8.64 | 8.14 | 9.7 | 32.3 | 1 |
| 6 | 3 | 8.54 | 8.28 | 48.1[e] | 67.0 | Thixotripic |
| 5 | 4 | 8.64 | 8.45 | 81.2[e] | 180.0+ | Thixotropic |
| 4 | 5 | 8.72 | 8.59 | 80.2[e] | 180.0+ | Thixotropic |
| 3 | 6 | 9.27 | 8.89 | 86.4[e] | 26.8 | 0 |
| 2 | 7 | 9.73 | 9.52 | 100.4[e] | 36.0 | 0 |
| 1 | 8 | 9.81 | 9.41 | 180.0+[e] | 36.9 | 0 |
| 0 | 9 | 9.93 | 9.20 | 180.0+[e] | 31.3 | 0 |

[a]RESIN A: 100 parts Rosin SS, 15 parts Fumaric acid, 11.5 parts Amine HH, heated to 240° C. after fumaric acid reaction at 200° C. Amine HH is a polyamine blend (manufactured by Union Carbide) consisting of the following major ingredients:
Aminoethylpiperazine 55.1–63.0%
Triethylenetetramine 25.8–35.8%
Aminoethylethanolamine 5.6–9.3%
Diethylenetriamine 5.1–6.9%
Hydroxyethylpiperazine 1.3–3.1%
[b]A: before ageing, B: after ageing.
[c]In seconds via a #3 Shell Cup.
[d]Range of precipitation: 0 = no precipitation, 1 = slight precipitation, 2 = some precipitate, 3 = precipitate, and 4 = heavy precipitate.
[e]Foamy sample.

A good storage stable ink formulations was formulated using 7 parts LAS to 2 parts Resin A. However, the best results were achieved with the higher percentages of Resin A substitution.

EXAMPLE 2

A number of black inks were formulated for evaluation as follows:
- 18.0% Vulcan K (a carbon black manufactured by Cabot Chemicals, Inc.)
- 9.0% Lignin Amine Salt/Acrylic Binder resin combination (adjusted with monoethanolamine)
- 0.5% Surfynol 104E (a defoamer manufactured by Air Products, Inc.)
- 72.5% Water A lignin amine salt (LAS) binder was produced following the method outlined in Example 1. A series of LAS/acrylic resin combinations were produced for use in the ink evaluations via the following procedure. Varying amounts of different commercially available acrylic grind resins (see Table II below) were dissolved at 30–35% N.V. with the aid of monoethanolamine (pH 9.0) and added to slurries of LAS at pH 9.2. Each composition was stirred for 30 minutes and the pH readjusted to 9.2. Carbon black was added and ground for 1.5 hours on a paint shaker. The grinds were readjusted to pH 8.5 (after grinding the pH values were between 7.8 and 8.2) and stored in an oven at 125.F for 3 weeks. The results are listed in Table II below.

TABLE II

Evaluation of Lignin Amine Salt/Acrylic Resin Combinations Aged for 3 Weeks at 125° F. Carbon Black: Vulcan K

| % LAS[a] | % Resin | Resin Type | pH Value[b] A | B | Viscosity[b)c] A | B | Comments[d] |
|---|---|---|---|---|---|---|---|
| 9 | — | | 7.95 | 8.12 | 8.7 | 9.3 | 2 |
| 6.24 | 1.56 | Morez 100[e] | 8.72 | 8.57 | 8.8 | 9.9 | 1 |
| 4.62 | 2.38 | Morez 100[e] | 8.40 | 8.77 | 7.9 | 8.4 | 2 |
| 3 | 3 | Morez 100[e] | 8.96 | 8.74 | 8.0 | 7.9 | 1 |
| 6.24 | 1.56 | J-62[f] | 8.96 | 8.28 | 8.3 | 32.8 | 1 |
| 4.62 | 2.38 | J-62[f] | 7.91 | 8.57 | 16.7 | 14.0 | 0 |
| 3 | 3 | J-62[f] | 9.31 | 9.41 | 9.8 | 11.9 | 1 |
| 6.24 | 1.56 | J-67[f] | 8.68 | 8.22 | 9.5 | 10.2 | 4 |
| 4.62 | 2.38 | J-67[f] | 8.63 | 8.22 | 8.5 | 9.6 | 2 |
| 3 | 3 | J-67[f] | 8.78 | 8.50 | 8.9 | 7.3 | 0 |
| 6.24 | 1.56 | J-85[f] | 8.44 | 7.84 | 15.8 | 12.8 | 0–1 |
| 4.62 | 2.38 | J-85[f] | 8.52 | 7.72 | 20.8 | 16.8 | 0 |
| 3 | 3 | J-85[f] | 9.30 | 9.16 | 18.1 | 15.7 | 0 |
| 6.24 | 1.56 | J-91[f] | 8.90 | 8.45 | 9.5 | 8.3 | 0 |
| 4.62 | 2.38 | J-91[f] | 8.43 | 8.47 | 23.3 | 20.6 | 0 |
| 3 | 3 | J-91[f] | 8.61 | 8.45 | 8.3 | 9.4 | 0 |
| 6.24 | 1.56 | J-142[f] | 8.81 | 8.20 | 9.9 | 11.1 | 1 |

TABLE II-continued

Evaluation of Lignin Amine Salt/Acrylic Resin Combinations
Aged for 3 Weeks at 125° F.
Carbon Black: Vulcan K

| % LAS[a] | % Resin | Resin Type | pH Value[b] A | B | Viscosity[b)c] A | B | Comments[d] |
|---|---|---|---|---|---|---|---|
| 4.62 | 2.38 | J-142[f] | 8.08 | 8.54 | 12.0 | 10.9 | 0 |
| 3 | 3 | J-142[f] | 8.70 | 8.68 | 43.0 | 26.5 | 0 |
| 6.24 | 1.56 | J-678[f] | 8.49 | 8.32 | 7.9 | 9.0 | 1 |
| 4.62 | 2.38 | J-678[f] | 8.76 | 9.13 | 61.5[g] | 9.1 | 1 |
| 3 | 3 | J-678[f] | 8.49 | 8.72 | 9.9 | 10.4 | 0 |
| 6.24 | 1.56 | J-680[f] | 8.46 | 7.88 | 18.1 | 9.5 | 4 |
| 4.62 | 2.38 | J-680[f] | 8.99 | 8.33 | 7.1 | 8.3 | 0-1 |
| 3 | 3 | J-680[f] | 9.19 | 8.69 | 7.7 | 10.1 | 0-1 |
| 6.24 | 1.56 | J-682[f] | 9.21 | 8.49 | 180.0[g] | 28.4 | 0-1 |
| 4.62 | 2.38 | J-682[f] | 9.39 | 9.11 | 11.4 | 12.1 | 2-3 |
| 3 | 3 | J-682[f] | 9.60 | 9.39 | 8.8 | 16.1 | 0-1 |

[a]Lignin Amine Salt.
[b]A: before ageing. B: after ageing.
[c]In seconds via a #3 Shell Cup.
[d]Range of Precipitation: 0 = no precipitate, 1 = slight precipitate, 2 = some precipitate, 3 = precipitate, 4 = heavy precipitate, and 5 = gel.
[e]Manufactured by Morton Thiokol.
[f]Manufactured by S. C. Johnson (Joncryl ® resins).
[g]Foamy Sample.

Each acrylic resin type achieved good results in at least one formulation with LAS, with the Jonrez-91 formulations achieving consistently excellent results.

EXAMPLE 3

A number of black inks were formulated for evaluation as follows:
18.0% Vulcan K (a carbon black manufactured by Cabot Chemicals, Inc.)
9.0% Lignin Amine Salt/Rosin binder resin combination (adjusted with monoethanolamine)
0.5% Surfynol 104E (a defoamer manufactured by Air Products, Inc.)
72.5% Water A lignin amine salt binder was produced via the method outlined in Example 1. This LAS binder was in turn combined with different rosin resins (also produced via the method outlined in Example 1) to yield combinations for use in the ink evaluations via the following procedure. The different rosin grind resins (see Table III below) were dissolved at 30-35% N.V. with the aid of monoethanolamine (pH 9.0) and added to slurries of LAS at pH 9.2. Each composition was stirred for 30 minutes and the pH readjusted to 9.2. Carbon black was added and ground for 1.5 hours on a paint shaker. The grinds were readjusted to pH 8.5 (after grinding the pH values were between 7.8 and 8.2) and stored in an oven at 125.F for 3 weeks. The results are listed in Table III below.

TABLE III

Evaluation of Lignin Amine Salt/Rosin Resin Combinations
Aged 3 Weeks at 125° F.
Carbon Black: Vulcan K

| % LAS | % Resin | Resin Type | pH Value[d] A | B | Viscosity[d)e] A | B | Comments[f] |
|---|---|---|---|---|---|---|---|
| 6.24 | 1.56 | 6143-56A[a] | 8.47 | 8.19 | 15.7 | 39.6 | 1 |
| 6.24 | 1.56 | 6143-56B[b] | 8.21 | 8.25 | 20.5 | 40.6 | 2 |
| 6.24 | 1.56 | 6143-56C[c] | 8.31 | 8.35 | 9.2 | 35.7 | 0-1 |

[a]Rosin SS reacted first with 15% fumaric acid, and then with 2% paraformaldehyde.
[b]Rosin SS reacted first with 2% paraformaldehyde, and then with 15% fumaric acid.
[c]Rosin SS reacted with 15% fumaric acid, 11.5% Amine HH, and 1% paraformaldehyde. Amine HH is a polyamine blend (manufactured by Union Carbide) consisting of the following major ingredients:
Aminoethylpiperazine 55.1-63.0%
Triethylenetetramine 25.8-35.8%
Aminoethylethanolamine 5.6-9.3%
Diethylenetriamine 5.1-6.9%
Hydroxyethylpiperazine 1.3-3.1%
[d]A: before ageing. B: after ageing.
[e]In seconds via a #3 Shell Cup.
[f]Range of precipitation: 0 = no precipitate, 1 = slight precipitate, 2 = some precipitate, 3 = precipitate, and 4 = heavy precipitate.

Additional LAS/Rosin resin binders were produced (at different concentrations) and used to formulate inks which were submitted to an ageing study, the results of which are listed in Table IV below.

TABLE IV

Evaluation of Lignin Amine Salt/Rosin Resin Combinations
Aged 3 Weeks at 125° F.
Carbon Black: Vulcan K

| % LAS | % Resin | Resin Type | pH Value[d] A | B | Viscosity[d)e] A | B | Comments[f] |
|---|---|---|---|---|---|---|---|
| 5.5 | 0.5 | 6143-56A[a] | 8.65 | 8.46 | 7.1 | 7.9 | 3 |
| 5.0 | 1.0 | 6143-56A[a] | 8.68 | 9.24 | 7.6 | 8.6 | 2 |
| 4.5 | 1.5 | 6143-56A[a] | 8.27 | 8.05 | 6.7 | 7.2 | 3 |
| 4.0 | 2.0 | 6143-56A[a] | 8.52 | 8.90 | 9.7 | 15.4 | 1 |
| 5.5 | 0.5 | 6143-56B[b] | 8.38 | 8.04 | 7.1 | 7.9 | 3 |
| 5.0 | 1.0 | 6143-56B[b] | 8.61 | 8.44 | 8.1 | 9.7 | 3 |
| 4.5 | 1.5 | 6143-56B[b] | 8.55 | 8.27 | 10.3 | 23.0 | 1 |
| 4.0 | 2.0 | 6143-56B[b] | 8.60 | 8.51 | 7.1 | 9.4 | 2 |
| 5.5 | 0.5 | 6143-56C[c] | 8.58 | 8.19 | 6.9 | 8.2 | 2 |
| 5.0 | 1.0 | 6143-56C[c] | 8.46 | 8.32 | 7.1 | 6.9 | 4 |
| 4.5 | 1.5 | 6143-56C[c] | 8.53 | 8.51 | 8.5 | 12.2 | 1 |

TABLE IV-continued

Evaluation of Lignin Amine Salt/Rosin Resin Combinations
Aged 3 Weeks at 125° F.
Carbon Black: Vulcan K

| % LAS | % Resin | Resin Type | pH Value[d] A | B | Viscosity[d)e] A | B | Comments[f] |
|---|---|---|---|---|---|---|---|
| 4.0 | 2.0 | 6143-56C[c] | 8.65 | 8.65 | 7.0 | 13.2 | 1 |

[a]Rosin SS reacted with 15% fumaric acid and 2% paraformaldehyde.
[b]Rosin SS reacted first with 2% paraformaldehyde and 15% fumaric acid.
[c]Rosin SS reacted with 15% fumaric acid, 11.5% Amine HH and 1% paraformaldehyde. Amine HH is a polyamine blend (manufactured by Union Carbide) consisting of the following major ingredients:
Aminoethylpiperazine 55.1-63.0%
Triethylenetetramine 25.8-35.8%
Aminoethylethanolamine 5.6-9.3%
Diethylenetriamine 5.1-6.9%
Hydroxyethylpiperazine 1.3-3.1%
[d]A: before ageing, B: after ageing.
[e]In seconds via a #3 Shell Cup.
[f]Range of precipitation: 0 = no precipitation, 1 = slight precipitate, 2 = some precipitate, 3 = precipitate, 4 = heavy precipitate, and 5 = gel.

Each rosin resin type achieved good results in at least one formulation with LAS.

EXAMPLE 4

A number of black inks were formulated for evaluation as follows:
20.0% CSX-220 (a carbon black manufactured by Cabot Corporation)
5.0-8.0% LAS/Rosin resin combination (adjusted with monoethanolamine)
1.0% Urea
0.5% Surfynol 104E (a defoamer manufactured by Air Products, Inc.)
70.5-73.5% Water Following the methods outlined in Example 1, both LAS and rosin binders were produced, and combined, to yield a LAS/Rosin resin combination for evaluation via ink formulations. Table V shows the results of the ageing experiments. In one series varying amounts of LAS as the sole resin were used and monoethanolamine was compared with Amine HH as the "solubilizing" base. This polyethylene amine mixture behaves like formaldehyde or calcium-ions when added to an ammonia solution of kraft lignin. Lignin precipitates in fine particle size at pH values of 11 and above. The anionic lignin polymer forms a high molecular weight complex with the cationic polyamine which dissolves in water forming a polycation:

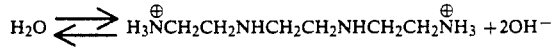

Ethanolamine, because of the lower molecular weight and the lower nitrogen content, is able to form only a monoammonium salt. Thus, when ethanolamine is added to a ammonia solution of lignin, no precipitate is formed.

The higher molecular weight kraft lignin/Amine HH complex appears to stabilize carbon black better than kraft lignin/monoethanolamine mixtures giving cause to less sedimentation upon ageing.

TABLE V

Evaluation of LAS and Combination
with Auxiliary Resins with CSX -220 Carbon Black
Aged 3 Weeks at 125° F.

| % LAS | % Resin | Resin Type | pH Value[a] A | B | Viscosity[a)b] A | B | Comments[c] |
|---|---|---|---|---|---|---|---|
| 8 | 0 | — | — | 8.00 | 10.0 | 10.5 | 4 |
| 7 | 0 | — | — | 8.16 | 9.0 | 9.3 | 3 |
| 6 | 0 | — | — | 8.30 | 8.7 | 8.6 | 4 |
| 5 | 0 | — | — | 8.13 | 7.9 | 8.4 | 3 |
| 8 | 0 | (Amine HH)[d] | 7.15 | 8.26 | 7.8 | 10.2 | 1 |
| 7 | 0 | (Amine HH)[d] | 7.28 | 8.25 | 8.4 | 10.7 | 1 |
| 6 | 0 | (Amine HH)[d] | 7.36 | 8.63 | 7.7 | 9.4 | 1 |
| 5 | 0 | (Amine HH)[d] | 7.34 | 8.79 | 7.2 | 14.9 | 1 |
| 6.0 | 2.0 | SM-700[e] | 8.09 | 8.30 | 7.4 | 10.1 | 1 |
| 5.25 | 1.75 | SM-700[e] | 8.24 | 8.42 | 8.2 | 8.8 | 1 |
| 4.50 | 1.5 | SM-700[e] | 8.32 | 8.37 | 7.0 | 7.8 | 1 |
| 4.0 | 4.0 | SM-700[e] | 8.75 | 8.54 | 31.0 | 17.1 | 0 |
| 3.5 | 3.5 | SM-700[e] | 8.50 | 8.31 | 10.5 | 11.3 | 0 |
| 3.0 | 3.0 | SM-700[e] | 8.37 | 8.37 | 7.5 | 10.3 | 1 |
| 2.5 | 2.5 | SM-700[e] | 8.34 | 8.38 | 6.2 | 9.5 | 3 |

[a]A: before ageing, B: after ageing.
[b]In seconds via a #3 Shell Cup.
[c]Range of precipitation: 0 = no precipitation, 1 = slight precipitate, 2 = some precipitate, 3 = precipitate, and 4 = heavy precipitate.
[d]Amine HH was used for pH adjustment.
[e]Jonrez SM-700: a tall-oil rosin-based resin manufactured by Westvaco.

TABLE VI

Evaluation of Various Amines and Polyalkylene Amines as
Solubilizing Bases for Lignin/Rosin Containing Black News Ink

| Amine | Viscosity at 18% Carbon Black[a] | Viscosity at 13% Carbon Black[a] | Color Strength[b] | Hold-Out[e] |
|---|---|---|---|---|
| Ethanolamine (MEA)[d] | 12.80[1] | 6.40[4] 6.80[90] | 18.91 | −8.90 |
| Ethanolamine MEA (6% resin)[d] | 7.00[1] | 0  5.20[10] | 24.33 | −10.41 |
| Morpholine (MO) | 10.28[1] | 6.38[4] 6.11[28] | 22.39 | −9.20 |
| Aminoethylethanolamine (AEEA) | 11.22[1] | 6.42[4] 6.20[28] | 21.28 | −8.26 |
| Ethylenediamine (EDA) | 9.38[1] | 6.58[4] 5.86[28] | 20.46 | −7.71 |
| Amine HH | Thixotropic[1/c] | 7.36[4] 8.65[28] | 17.50 | −7.61 |
| Aminoethylpiperazine (AEP) | Thixotropic[1/c] | 7.45[1] 7.06[28] | 17.55 | −7.43 |
| Diethylene triamine (DETA) | Thixotropic[1/c] | 7.52[1] 7.30[28] | 17.95 | −7.23 |
| Triethylene tetramine (TETA) | Thixotropic[1/c] | 7.48[1] 7.50[28] | 16.81 | −7.78 |
| Tetraethylene pentamine (TEPA) | Thixotropic[1/c] | 7.06[1] 7.38[28] | 16.90 | −7.61 |
| Bis-aminopropylamine (BAPA) | Thixotropic[1/c] | 7.85[1] 7.12[28] | 16.38 | −6.92 |

[a]In seconds via a #3 Shell Cup, viscosity superscript indicates days of ageing.
[b]Determined against black tile as standard, lower number indicates darker color.
[c]No flow.
[d]Indicates this sample was heat aged for 3 weeks at 125° F.
[e]Color strength determined on the reverse side of the paper against white tile as standard; higher negative number indicates darker color.

TABLE VII

The Effect of Amine HH on the Viscosity of Black News Ink
(18% Vulcan K, 9% 6143-84A, 1% Surfynol 104E)

| % Amine HH | Viscosity at 18% Carbon Black[a] | | | Viscosity at 13% Carbon Black[a] | | | Color Strength[b] | Hold-Out[e] |
|---|---|---|---|---|---|---|---|---|
| 0.1 | $8.76^1$ | $7.76^{25d}$ | $8.18^{90d}$ | — | — | — | 19.91 | −7.31 |
| 0.2 | $8.55^1$ | $7.58^{25d}$ | $7.66^{90d}$ | — | — | — | 20.71 | −7.87 |
| 0.3 | $8.65^1$ | $7.62^{25d}$ | $7.75^{90d}$ | — | — | — | 20.30 | −7.66 |
| 0.4 | $8.37^1$ | $7.64^{25d}$ | $8.40^{90d}$ | — | — | — | 19.91 | −7.13 |
| 0.6 | $66.60^1$ | — | — | $8.36^1$ | $11.59^{27}$ | $8.83^{90d}$ | 17.64 | −7.52 |
| 0.8 | $87.70^1$ | — | — | $7.36^1$ | $12.02^{27}$ | $8.65^{90d}$ | 17.41 | −7.63 |
| 1.0[c] | $58.30^1$ | — | — | $7.36^1$ | $12.74^{27}$ | $8.65^{90d}$ | 17.50 | −7.27 |
| 1.2[c] | $59.60^1$ | — | — | $7.36^1$ | $13.33^{27}$ | $8.97^{90d}$ | 17.50 | −7.54 |

[a] In seconds via a #3 Shell Cup, viscosity superscript indicates days of ageing.
[b] Determined against black tile as standard, lower number indicates darker color.
[c] No monoethanolamine was added.
[d] Sedimentation.
[e] Color strength determined on the reverse side of the paper against white tile as standard; higher negative number indicates darker color.

EXAMPLE 5

A number of black inks were formulated for evaluation as follows:

- 18 parts Vulcan K ( a carbon black manufactured by Cabot Chemicals, Inc.)
- 6-9 parts Lignin Amine Salt/Rosin/Acrylic binder resin
- 0.5 parts Surfynol 104E (a defoamer manufactured by Air Products, Inc.)
- 72.5-75.5 parts Water (adjusted to pH 9.2 with monoethanolamine)

Following the methods outlined in Example 1, both LAS and rosin Resin A binders were produced and combined (at a ratio of 80 parts by weight of LAS to 20 parts by weight of Resin A) to yield a LAS/Rosin resin combination (hereafter referred to as Resin 1).

Likewise, two additional LAS/Rosin resin combinations were produced via the methods outlined in Example 1. The first (hereafter referred to as Resin 2) is the product of combining 80 parts by weight of LAS with 20 by weight of Jonrez SM-700 (a rosin binder manufactured by Westvaco). The other (hereafter referred to as Resin 3) is the product of combining 80 parts by weight of LAS with 20 parts by weight of Stafor 50 (a fortified rosin manufactured by Westvaco).

Resins 1, 2, and 3 were subsequently combined with varying amounts of the acrylic binder Joncryl 85 (manufactured by S. C. Johnson) to produce different LAS/Rosin/Acrylic binder resins These resins were subsequently formulated into inks (see above) and evaluated. The results are listed in Table VIII below.

Each LAS/rosin/acrylic binder resin composition achieved excellent results in at least one formulation.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. An improved lignin amine salt binder resin composition comprising a lignin amine salt prepared by the steps comprising:

(a) lowering the pH of a black liquor residue of the kraft pulping process to a pH of about 9.5 to precipitate the lignin material therefrom;

(b) acidifying the lignin precipitate in aqueous slurry to an acidic pH level above about 5;

(c) washing the acidified lignin precipitate with water to remove inorganic salts and other impurities therefrom; and (d) adding an organic amine to an aqueous slurry of the washed lignin to form a lignin amine salt solution having a pH in excess of 5;

wherein the improvement comprises replacing 10 to 60% by weight of the lignin amine salt resin with acrylic resin, rosin resin, or a combination thereof.

2. The improved composition of claim 1 wherein the improvement comprises replacing 20 to 50% by weight of the lignin amine salt resin with acrylic resin, rosin resin, or a combination thereof.

3. The improved composition of claim 1 wherein the organic amine is a polyamine selected from the group consisting of diethylenetriamine, aminoethylpiperazine,

TABLE VIII

Performance of Black News Ink Prepared from Vulcan K with LAS/Rosin Resin/Acrylic Resin Combinations.

| % LAS Resin | % Acrylic Resin | Viscosity[a] Initial | Viscosity[a] After Heat Ageing | Sediment |
|---|---|---|---|---|
| 9.00 Resin 2 | — | $12.8^1$ | $54.4^{30}$ | gel |
| 6.24 Resin 2 | 1.56 Joncryl 85 | $27.7^1$ | $29.9^{30}$ | medium |
| 4.62 Resin 2 | 2.38 Joncryl 85 | $25.2^1$ | $32.5^{30}$ | sl. thixo |
| 3.00 Resin 2 | 3.00 Joncryl 85 | $22.2^1$ | $27.3^{30}$ | no |
| 9.00 Resin 3 | — | $10.1^1$ | $14.5^{30}$ | light |
| 6.24 Resin 3 | 1.56 Joncryl 85 | $14.5^1$ | $13.4^{30}$ | no |
| 4.62 Resin 3 | 2.38 Joncryl 85 | $14.6^1$ | $19.0^{30}$ | no |
| 3.00 Resin 3 | 3.00 Joncryl 85 | $14.3^1$ | $25.9^{30}$ | no |
| 9.00 Resin 1 | — | $10.5^1$ | $28.7^{30}$ | medium |
| 6.24 Resin 1 | 1.56 Joncryl 85 | $30.6^1$ | $20.0^{30}$ | light |
| 4.62 Resin 1 | 2.38 Joncryl 85 | $62.0^1$ | $29.0^{30}$ | light |
| 3.00 Resin 1 | 3.00 Joncryl 85 | $32.6^1$ | $30.6^{30}$ | no |

[a] In seconds via a #3 Shell Cup, Viscosity superscript indicates days of ageing.

piperazine, triethylenetetramine, aminoethylethanolamine, hydroxyethylpiperazine, and combinations thereof.

4. The improved composition of claim 1 wherein the acrylic resins are styrene (α-methylstyrene)-acrylic acid copolymers having a molecular weight in the range of about 1,000–100,000 and an acid number of about 70 to 250.

5. The improved composition of claim 1 wherein the rosin resins are rosins fortified via a Diels-Alder reaction with fumaric acid or maleic anhydride and further reacted in an esterification reaction with a member selected from the group consisting of pentaerythritol, glycerol, glycol, polyglycols, sorbitol, or combinations thereof, and the rosin resins have an acid number in the range of 150 to 220.

6. The improved composition of claim 1 wherein the rosin resins are rosins fortified via a Diels-Alder reaction with fumaric acid or maleic anhydride and further reacted with a polyalklene amine selected from the group consisting of aminoethylpiperazine, triethylenetetramine, aminoethylethanolamine, piperazine, diethylenetriamine, ethylenediamine, hydroxyethylpiperazine, and combinations thereof, wherein the reaction is at ratio of 0.1 to 0.5 moles of polyalklene amine per mole of fumaric acid or maleic anhydride, and the rosin resins have an acid number in the range of 130 to 200.

7. A black aqueous printing ink composition black pigment and the improved binder resin composition of claim 1 dispersed in an aqueous medium.

8. A black aqueous printing ink composition comprising black pigment and the improved binder resin composition of claim 2 dispersed in an aqueous medium.

* * * * *

UNITED STATES PATENT AND TRADEMARK OFFICE
CERTIFICATE OF CORRECTION

PATENT NO. : 5,188,665

DATED : February 23, 1993

INVENTOR(S) : Peter Schilling

It is certified that error appears in the above-identified patent and that said Letters Patent is hereby corrected as shown below:

In column 2, line 53, delete "b" and substitute therefor --be--.

In column 3, line 24, delete "ono-" and substitute therefor -- mono- --.

In column 3, line 43, after by, insert --reference).--.

In column 5, line 37, delete "Thixotripic" and substitute therefor --Thixotropic--.

In column 6, line 46, delete "125.F" and substitute therefor --125°F--.

In column 7, line 59, delete "125.F" and substitute therefor --125°F--.

In Claim 7, column 14, line 12, after composition, insert --comprising--.

Signed and Sealed this

Ninth Day of November, 1993

*Attest:*

BRUCE LEHMAN

*Attesting Officer*  Commissioner of Patents and Trademarks